May 5, 1953 — G. M. GUSTIN — 2,637,223
CONDITIONING APPARATUS FOR ROTARY SAWS
Filed April 4, 1949 — 2 SHEETS—SHEET 1

INVENTOR.
George M. Gustin
BY W. P. Hahn
ATTORNEY.

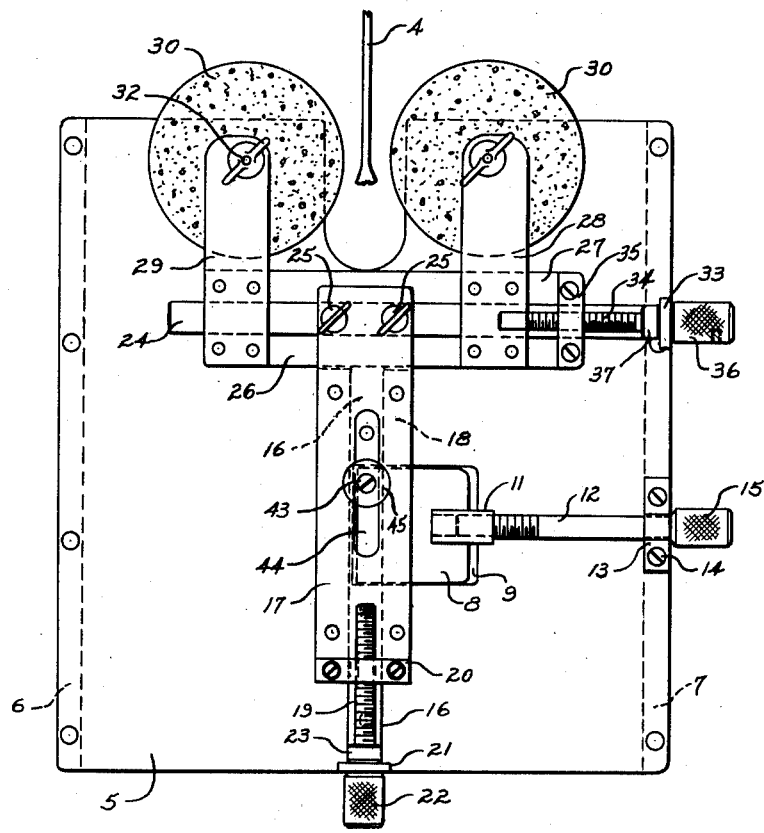

Patented May 5, 1953

2,637,223

UNITED STATES PATENT OFFICE 2,637,223

CONDITIONING APPARATUS FOR ROTARY SAWS

George M. Gustin, Wabash, Ind.

Application April 4, 1949, Serial No. 85,428

9 Claims. (Cl. 76—48)

1

The present invention relates to improvements in saw jointing and side dressing devices for circular saws. The invention is particularly adapted for use in that type of circular saws wherein the work is adapted to be fed to the saw by a travelling chain conveyor which primarily comprises a pair of chain conveyors, one disposed on each side of the saw.

Usually in saws of this character the rotary saw is vertically adjustably carried on supporting mechanism disposed beneath the table and the saw is adapted to be projected above the top surface of the table and operate between conveyor chains which convey the work across the top of the table and against the saw.

It is one of the objects of my present invention to provide a jointing and side dressing apparatus which may be readily placed and secured in position for operation upon the saw while it is rotating above the table top.

Another object of my invention is to provide a jointing and side dressing structure which provides means for rotatably supporting circular dressing stones.

Another object of my invention is to provide a device having the characteristics as set forth in the above paragraph in which the dressing stone may be adjusted toward and away from the side edges of the saw.

A still further object of my invention is to provide a structure wherein the edges of the teeth, as well as the sides thereof, may be suitably dressed.

For the purpose of disclosing my invention I have illustrated an embodiment thereof in the accompanying drawings in which:

Fig. 2 is a plan view of the side dressing apparatus;

Fig. 3 is a side elevation thereof;

Fig. 4 is an end view of the structure illustrated in Fig. 2 with the clamping mechanism left off for clearer understanding;

Figure 1:
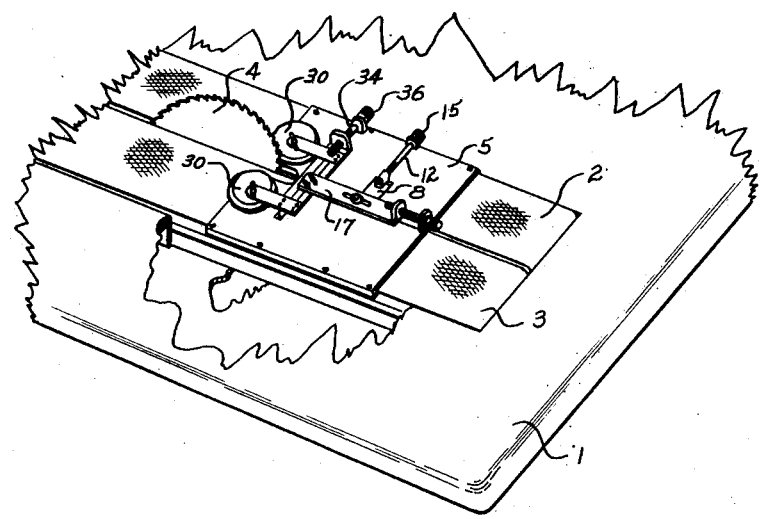
Fig. 1 is a plan perspective of a saw and its associated parts showing my jointing and side dressing device in position.
Figure 6:
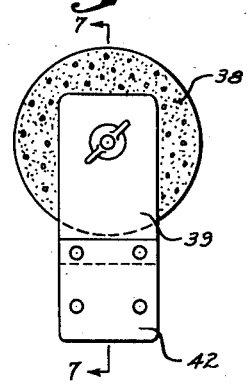
Fig. 6 is a plan view of the jointing member.
Figure 7:
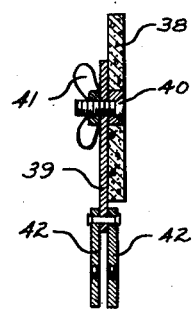
Fig. 7 is a section view thereof taken on the line 7—7 of Fig. 6.
Figure 5:
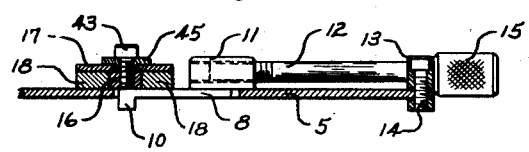
Fig. 5 is a detailed view of the clamping mechanism.

In the accompanying drawings I have illustrated a bed or top 1 of a rip saw machine having a work support, herein shown as including a pair of conveyor chains 2 and 3, and through which, as between the chains 2 and 3, there is adapted to project a rotary saw blade 4. In machines of this character the height of the saw blade 4 may be adjusted vertically relative to the work support to accommodate different thicknesses of the work such as wood to be sawed. Suitable means are provided for rotating the saw.

In the embodiment of my invention illustrated, in the accompanying drawings, I provide a base plate 5 having a pair of downwardly extending flanges 6 and 7, which flanges may be integrally formed on the under-face of the plate 5 or may be strips of material riveted or other wise secured thereto. This base plate 5 is of just sufficient width to extend across the top face of the conveyor chains 2 and 3 with the flanges 6 and 7 embracing the outer edges of the chains.

The base plate 5 is rigidly clamped to one of the chains although the plate extends across both of the chains. This clamping means comprises a clamp 8 disposed in a cut-out opening 9 in the plate 5 and provided with a down-turned clamping jaw 10 adapted to engage one side of one of the conveyor chains, in the present instance the chain 2, whereby the bed plate 5 will be securely anchored to the chain 2 by being gripped between the jaw 10 and the side flange 7. To accomplish this clamping action the clamping plate 8 has secured thereon a boss 11, which may be welded or otherwise secured thereon and it is to be noted that this boss 11 extends over, for a short distance, the top of the base plate 5 to sustain the clamping plate 8 in substantially the same plane as the base plate 5. The boss 11 is internally screw threaded to receive the threaded end of an adjusting screw 12 which extends through a yoke 13, in the present instance secured to the base plate 5 by machine screws 14. The adjusting screw 12 is provided with a head 15 which abuts against the yoke 13 so that by rotating the adjusting screw 12 the clamping jaw 10 may be moved in the clamping position against the edge of the feed chain 2.

Extending longitudinally of the base plate 5 and equidistantly spaced between the edges of the base plate I provide a guide rail 16 which is riveted or otherwise rigidly secured to the base plate 5. This guide rail provides a guiding member for a longitudinally adjustable arm 17 which is preferably in the form of a plate provided on its under-face with a pair of spaced apart ribs or rails 18, which embrace the guide rail 16. This arm 17 is adjusted toward and away from the edge of the saw 4 through the medium of an adjusting screw 19 screw threaded into a boss 20 extending upwardly from the plate 17 and passing through a stop member 21 extending upwardly from the rear end to the rail 16. The screw at its rear end is provided with a large head 22 adapted to abut against the stop member 21 and with a collar 23 which abuts against the opposite face of the stop member 21 thereby holding the screw 19 against axial displacement. By this arrangement the rotation of the screw 19 will adjust the plate 17 toward or away from the edge of the saw 4.

The "forward" end of the plate 17 has secured thereto a transversely extending rail 24, by means of a pair of winged screws 25 which rigidly secure the end of the arm or plate 17 to the rail 24.

This rail 24 provides a transverse guide member for a carriage for the side dressing stones for the saw. This carriage comprises a pair of rails 26 and 27 which embrace the guide rail 24 and a pair of supporting arms 28 and 29 which are respectively riveted to the side rails 26 and 27 to not only secure the arms 28 and 29 to the rails 26 and 27, but also to maintain the rails 26 and 27 in their spaced relation. Each of the supporting arms 28 and 29 is adapted to carry a circular conditioning stone, in this instance a dressing stone 30 provided with a metallic hub 31 through which and the arm extends a bolt 32. This provides an axle on which the dressing stone may be rotated to bring different portions of the periphery of the stone to the sides of the saw teeth.

For adjusting the stones toward and away from the sides of the teeth of the saw the guide rail 24, at one end, is provided with an up-turned stop member 33 through which extends the threaded screw 34 adapted to thread into a yoke 35 extending upwardly from and secured to the ends of the guide rails 26 and 27. This screw 34 is provided with an enlarged head 36 which abuts against one face of the stop member 33 and with the collar 37 which abuts against the opposite face of the stop member 33 so that the screw 34 will be held axially stationary relatively to the rail 24.

In operation, the base plate 5 is secured, by the manipulation of the clamp plate 8 to the feed chain 2 of the saw. It is understood of course that the feed chain is stationary during the operation of dressing the saw blade. With the base plate 5 clamped into position, the dressing stones 30 may be adjusted by the screw 19 toward the axis of the saw to properly position their peripheries relative to the sides of the saw teeth. With this longitudinal adjustment obtained, by the manipulation of the screw 34, first one and then the other of the dressing stones 30 may be nicely adjusted toward the sides of the teeth of the rotating saw. It will be noted, having particular reference to Fig. 2 of the drawings, that the arcuate dressing edge of the stone when moved into engagement with the sides of the teeth of the saw 4, it contacts the sides of the teeth behind the cutting edge of the teeth. Accordingly, while the sides of the teeth are dressed, the cutting edge of the teeth, or points of the teeth, are not contacted resulting in the proper dressing of the teeth without destroying the cutting properties of the saw.

It is obvious that this may be accomplished by adjusting the carrier or support 27 by means of the adjusting plate 17 to the desired position and then moving the flat disc-like dressing stones transversely so that their edges respectively will move in contact with the sides of the teeth to properly dress the same. Initially the edges of the stones are given a slight curvature as illustrated and with their grinding or dressing contact with the sides of the teeth of the saw, the stones being relatively soft, the edges of the stone will assume the same curvature as the set of the teeth of the saw and will dress the sides of the teeth of the saw to the same curvature. The dressing stones are rotatably mounted which permits the stone to be rotated by the operator during the side dressing operation.

In addition to dressing the sides of the teeth of the saw as above described I provide a means for conditioning the tops of the teeth of the saw. To this end I provide a jointing stone 38 which is rotatably supported on an arm 39 by means of a bolt 40, with its accompanying winged nut 41. The rear end of this arm 39 is provided with a pair of spaced apart clamp members 42. In order to use this jointing member the carriage, including the rail 24, is disconnected from the arm 17 by removing the screws 25. In place of this carriage the support 39 is secured into position on the end of the arm 17 through the medium of the screws 25 which pass through the openings in the top clamping plate 42 and thread into the openings in the bottom plate 42 between which top and bottom plates the end of the arm 17 is received. This securely affixes the jointing stone 38 to the arm or plate 17 and through the medium of the adjusting screw 19 the stone may be adjusted within close limits, to the tops of the teeth of the saw while it is rotating and thus grind the teeth of the saw. This jointing wheel 38 like the wheels 30 being rotatably mounted permits the rotation of the stone by the operator during the dressing or grinding of the teeth of the saw.

A screw 43 extends through a slot 44 in the plate or arm 17, through a washer 45 which bears on the top of the plate or arm 17, and threads into the rail 16 so that the plate 17 will be slidingly held in position to the guide rail.

From the above it will be observed that I have provided a circular jointing stone the center of which is on the center line of the saw to be jointed and which can be rotated while in contact with the saw blade. Therefore, the saw will not cut into the stone which would necessarily result in the edge of the saw not being square.

Circular saws are jointed while rotating to make them round so that they will be in perfect running balance and to produce a square edge prior to resharpening so that all teeth will cut in the same cutting circle and with the improved jointing stone and mounting therefore, this result may be accomplished.

Furthermore circular saws have to be set and dressed before they are used so that all teeth on each side of the saw blade will have the same amount of set and therefore will cut in the same plane. The teeth having the most set are dressed back to cooperate with the teeth having the least set. In this operation great care must be exercised not to produce "flats" on the sides of the teeth which would cause the teeth to heat up and become dull and useless. By my invention I am enabled to use a circular side dressing stone which is brought into contact to the saw blade behind the cutting edges to thereby avoid producing a "flat" on the side of the teeth. By my invention I am able to use a circular stone which is rotated to keep it round, during the dressing operation, and permits the wear of the stone to conform to the shape of the set.

I claim as my invention:

1. An apparatus for conditioning the teeth of a rotary saw having a work support on at least one side thereof, comprising a base plate supported on the work support, means for rigidly clamping said plate to said support, an adjustable arm slidably mounted on the top of said base plate in a plane parallel with the plane of said support, means for adjusting said arm on said base plate on a line at right angles to the axis of the saw, a conditioning stone support connected to and movable with said arm, a vertical axis mounted on said stone support, and a disc-like conditioning stone rotatably mounted on said axle and rotatable in a horizontal plane with its edge presented to the teeth of the saw.

2. An apparatus for conditioning the teeth of a rotary saw having a work support on at least one side thereof, comprising a base plate having down-turned flanges embracing the outer edges of said support, means for rigidly clamping said plate to said support, an adjustable arm slidably mounted on said base plate in a plane parallel to the plane of said support, means for adjusting said arm on a line at right angles to the axis of the saw, a conditioning stone support connected to and movable with said arm, a vertically extending axle mounted on said stone support, and a disc-like conditioning stone rotatably mounted on said axle and rotatable in a horizontal plane with its edge presented to the teeth of said saw.

3. An apparatus for conditioning the teeth of a rotary saw having a work support on at least one side thereof, comprising a base plate having down-turned flanges at its opposite edges embracing the outer edges of said work support, a clamping member having a downwardly extending jaw positioned to engage one edge of said support, means for transversely moving said clamping member relative to the base plate to clamp said work support between the clamping jaw and one of the down-turned flanges of said base plate, an adjusting arm slidably mounted on said base plate in a horizontal plane, means for adjusting said arm on a line at right angles to the axis of the saw, a conditioning stone support connected to and movable with the arm, a vertically disposed axle mounted on said stone support, and a disc-like conditioning stone rotatably mounted on said axle and rotatable thereon in a horizontal plane with its edge presented to the teeth of the saw.

4. An apparatus for conditioning the teeth of a rotary saw having a work support on at least one side thereof, comprising a base plate supported on said work support, means for clamping said plate to said work support, guide rails upon the upper surface of said plate extending at right angles to the axis of the saw, an adjusting arm slidably mounted on said guide rail and provided with guide members embracing the sides of the rail, means for slidably adjusting said arm on said guide rail, a conditioning stone support connected to and movable with said arm, a vertical axle mounted on said stone support, and a disc-like conditioning stone rotatably mounted on said axle and rotatable thereon in a horizontal plane with its edge presented to the teeth of the saw.

5. An apparatus for dressing the teeth of a rotary saw having a work support on at least one side thereof, comprising a base plate supported on said work support, means for rigidly clamping said plate to said work support, an adjustable arm slidably mounted on said base plate, means for adjusting said arm on a line at right angles to the axis of the saw, a guide member secured to the end of said arm extending transversely thereof, a disc-shaped dressing stone carriage slidably mounted on said guide member, a vertically disposed axle mounted on said carriage, and a conditioning stone rotatably mounted on said axle and rotatable in a horizontal plane with its edge presented to the sides of the saw teeth.

6. An apparatus for dressing the teeth of a rotary saw having a work support on at least one side thereof, comprising a base plate supported on said support, means for rigidly clamping said plate to said support, an adjustable arm slidably mounted on said base plate, means for adjusting said arm on a line at right angles to the axis of the saw, a guide member secured to the end of said adjusting arm and extending parallel to the axis of said saw, a carriage slidably mounted on said guide member, means for adjustably moving said carriage on said guide member, a dressing stone support mounted on said carriage, a vertically disposed axle mounted on said stone support, and a disc-like dressing stone rotatably mounted on said axle and rotatable in a horizontal plane with its edge presented to the sides of the saw teeth.

7. An apparatus for dressing the teeth of a rotary saw having a work support on at least one side thereof, comprising a base plate supported on said work support and in a parallel plane relative thereto, means for rigidly clamping said base plate to said support, an adjusting arm slidably mounted on said base plate, means for adjusting said arm on a line at right angles to the axis of the saw, a guide member connected to the end of said arm and extending parallel with the axis of the saw, a carriage slidably mounted on said guide member, a pair of spaced apart dressing stone supports mounted on said carriage, a vertically disposed axle carried on each of said stone supports, a disc-like dressing stone rotatably mounted on each of said axles and rotatable in a horizontal plane with its edge presented to the sides of the saw teeth, and means for slidably adjusting said carriage on said guide member.

8. An apparatus for dressing the teeth of a rotary saw having a work support on at least one side thereof, comprising a base plate supported on said work support in a plane parallel with the plane thereof, a guide rail mounted on the upper face of said base plate and extending at right angles to the axis of the saw, an adjusting arm slidably mounted on said guide rail and having a pair of spaced apart guide members embracing said guide rail, means for adjusting said adjusting arm toward and away from the axis of said saw, a guide rail connected to the end of said arm and extending parallel with the axis of said saw, a carriage transversely slidably mounted on said guide rail and including a pair of guide members embracing said guide rail, a pair of spaced apart arms mounted on said carriage, a vertically disposed axle mounted on each of said arms, a disc-like dressing stone rotatably mounted on each of said axles and rotatable in a horizontal plane with its edge presented to the sides of the saw teeth, and means for slidably adjusting said carriage on said second mentioned rail.

9. An apparatus for dressing the teeth of a rotary saw having a work support on at least one side thereof, comprising a base plate supported on said work support and in a plane parallel with the plane thereof, means for rigidly clamping said base plate to said support, a carriage slidably mounted on said base plate to move in a line parallel with the axis of said saw, a pair of spaced apart supporting arms mounted on said carriage, a vertically disposed axle disposed on each of said arms, a disc-like dressing stone rotatably mounted on each of said axles for rotation in a plane transversely to the plane of said saw with its peripheral edge presented to the side of the saw teeth, and means for moving said carriage toward and away from the axis of said saw.

GEORGE M. GUSTIN.

References Cited in the file of this patent

UNITED STATES PATENTS

| Number | Name | Date |
|---|---|---|
| 353,659 | Black | Dec. 7, 1886 |
| 422,323 | Strouse | Feb. 25, 1890 |
| 440,163 | Karshner | Nov. 11, 1890 |
| 542,548 | Barker | July 9, 1895 |
| 595,065 | Jones | Dec. 7, 1897 |
| 760,926 | Schroeder | May 24, 1904 |
| 769,008 | McMaster | Aug. 30, 1904 |
| 771,211 | Schroeder | Sept. 27, 1904 |
| 810,610 | Bishop | Jan. 23, 1906 |
| 1,051,153 | Nelson | Jan. 21, 1913 |
| 1,061,843 | Howarth | May 13, 1913 |
| 1,343,342 | Bray | June 15, 1920 |
| 1,481,621 | Neuman | Jan. 22, 1924 |
| 1,642,004 | Zumwalt | Sept. 13, 1927 |
| 1,796,663 | Osgood | Mar. 17, 1931 |
| 1,866,101 | Hach et al. | July 5, 1932 |
| 1,866,102 | Hach | July 5, 1932 |
| 1,867,939 | Davenport | July 19, 1932 |
| 2,199,325 | Taylor | Apr. 30, 1940 |
| 2,355,844 | Barbour et al. | Aug. 15, 1944 |
| 2,360,127 | Harley et al. | Oct. 10, 1944 |